(12) United States Patent
Maddocks

(10) Patent No.: US 8,186,586 B2
(45) Date of Patent: *May 29, 2012

(54) SYSTEM, METHOD, AND APPARATUS FOR SMART CARD PIN MANAGEMENT VIA AN UNCONNECTED READER

(75) Inventor: Ian Maddocks, Milton Keynes (GB)

(73) Assignee: DataCard Corporation, Minnetonka, MN (US)

( * ) Notice: Subject to any disclaimer, the term of this patent is extended or adjusted under 35 U.S.C. 154(b) by 382 days.

This patent is subject to a terminal disclaimer.

(21) Appl. No.: 12/479,464

(22) Filed: Jun. 5, 2009

(65) Prior Publication Data

US 2010/0308109 A1 Dec. 9, 2010

(51) Int. Cl.
*G06K 7/01* (2006.01)
*G06K 7/08* (2006.01)

(52) U.S. Cl. ............ 235/382.5; 235/375; 235/380; 235/451; 235/487; 235/492

(58) Field of Classification Search .......... 235/375, 235/379, 380, 382, 382.5, 451, 492, 383, 235/449, 487, 493
See application file for complete search history.

(56) References Cited

U.S. PATENT DOCUMENTS

| 4,386,266 A | 5/1983 | Chesarek |
| 5,321,242 A | 6/1994 | Heath |
| 6,473,500 B1 | 10/2002 | Risafi et al. |
| 2005/0139658 A1 | 6/2005 | Lambert et al. |
| 2007/0124238 A1 | 5/2007 | Hogg et al. |
| 2007/0210162 A1* | 9/2007 | Keen et al. ............... 235/451 |
| 2007/0282756 A1 | 12/2007 | Dravenstott et al. |
| 2009/0298464 A1 | 12/2009 | Schilling |
| 2010/0019045 A1 | 1/2010 | Sarkissian et al. |
| 2010/0313027 A1* | 12/2010 | Taylor ..................... 713/172 |

OTHER PUBLICATIONS

U.S. Appl. No. 12/479,490, filed Jun. 5, 2009.
U.S. Appl. No. 12/576,900, filed Oct. 9, 2009.

* cited by examiner

*Primary Examiner* — Tuyen K Vo
(74) *Attorney, Agent, or Firm* — Hamre, Schumann, Mueller & Larson, P.C.

(57) ABSTRACT

A system of changing the PIN associated with a smart card is described. A user can initiate the PIN change using a personal unwired smart card reader, rather than using a system, such as an ATM machine. The smart card reader, loaded with the smart card provides a cryptogram code, which can contain the user's requested new PIN or it can be provided to the issuer via alternative methods. Via various methods the cryptogram code is delivered to the card issuer's PIN change management system, including the user transposing the code from smart card reader screen to the card issuer's web site or audio DTMF transmission from the smart card reader speaker to the card issuer IVR system. Returned from the issuer, via a similar path, will be a command code that when processed by the smart card reader will result in a PIN change on the smart card.

14 Claims, 10 Drawing Sheets

Fig. 3A Smart Card Cryptogram Request
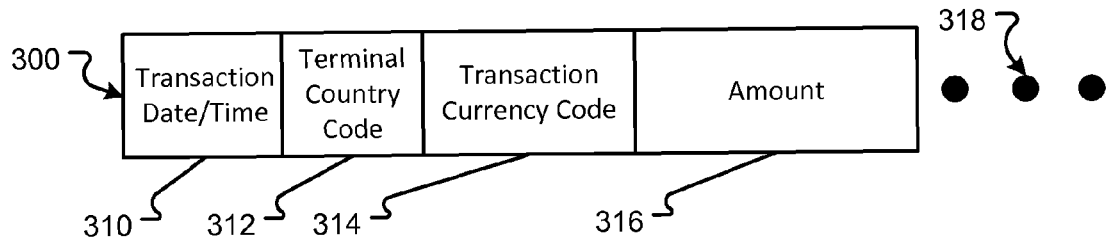
Fig. 3B Smart card reader cryptogram response
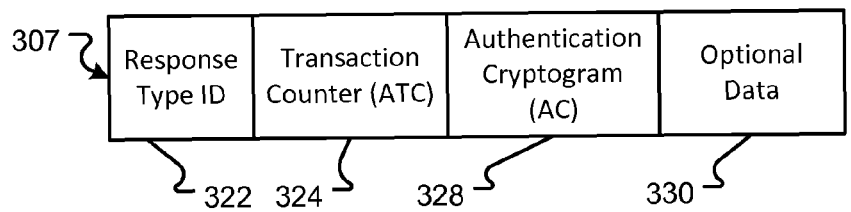
Fig. 3C PIN Management System -> User -> Smart card Reader response

SYSTEM, METHOD, AND APPARATUS FOR SMART CARD PIN MANAGEMENT VIA AN UNCONNECTED READER

RELATED APPLICATION

The Application is related to U.S. patent application Ser. No. 12/479,490, entitled SMART CARD PIN MANAGEMENT VIA AN UNCONNECTED READER, filed Jun. 5, 2009, which is incorporated by reference in its entirety for any and all purposes.

BACKGROUND OF THE INVENTION

Adoption of smart cards technology into financial payment card that allow a user to purchase goods or services have become prevalent around the world. Access to the smart card technology requires a special terminal (sometimes referred to a smart card readers) which provide multi-point connections to the smart card to deliver power to the smart card chip and provide communications between terminal and the card. Smart cards contain the same data as might be found on the Magnetic Strip plus additional risk management and typically the user's personal identification number (PIN).

A security feature of smart cards is that they are able to verify the PIN directly on the smart card chip. In order to achieve this 'offline' PIN verification the card needs to be loaded with the PIN. The PIN is typically selected by the Issuer at issuance of the card, or carried forward from the previously issued card, and if required the user is advised of the selected PIN by the Issuer.

With several accounts or smart cards, the user may have several PINs. The number of PINs can become difficult to remember, or the user may confuse which PIN is associated with a smart card or account. It has become apparent that a method to allow the user to select and manage their card's PIN is important. Unfortunately, smart cards are technically difficult to modify, and relies on a real-time two-way communication between the smart card and the Issuer. To date the methods available to change the PIN has been either 1) the user using the Issuers automated teller machine (ATM) or an ATM operated by a partner of the Issuer, or 2) A PIN change device directly connected to the Issuers network, typically located within an Issuer facility. Thus, to change the PIN, the Issuer has to provide services and systems to support PIN change and the user needs to travel to such a device. For many users this is not possible or practical due the Issuer not providing such services or those services being located too far away for the user to use.

BRIEF SUMMARY OF THE INVENTION

Embodiments presented herein are generally directed to a system where a user can perform a PIN change to a smart card supplied by an Issuer thought a smart card reader without a real-time connection to the Issuer's network. The user can execute a PIN change to their smart card without requiring the smart card to be inserted into networked Issuer device. Instead the user inserts their smart card into a stand-alone smart card reader device, which produces a cryptogram for the Issuer's PIN change management system and waits for a response cryptogram in order to complete the PIN change execution.

The PIN change management system can also include additional messages for the smart card such as unblock locked smart cards or setting risk management parameters on the smart card.

The new PIN value is embedded within the response cryptogram from the Issuer's PIN change management system.

The supply of the PIN to the PIN change management system can be conducted by several methods, and is out of scope of this invention. However for the purpose of providing a complete view of the PIN change process the method of PIN update explained thought the rest of this document is based on the User providing the new PIN to the smart card reader for embedding within the cryptogram generated by the smart card/card reader and provided to the Issuer PIN change management system. Privacy and integrity is managed purely by the smart card, the smart card reader device providing process flow to the smart card reader and communications interfaces.

With the smart card inserted into the smart card reader, the User is prompted to enter the new PIN value into the smart card reader device. The smart card is prompted, by way of a payment transaction, to create a cryptogram using data including the new PIN by the smart card reader. The smart card reader converts the resultant cryptogram into a form suitable for transmission. Examples of the cryptogram transmission include: 1) Compacting and decimalization, and displayed to User, 2) Audio DTMF encoding via device speaker. The User now has the task of providing the cryptogram data to the Issuer via methods such as: 1) Entry of data on to web page, 2) Telephone connection, 3) Email, and 4) SMS text message. Issuer's PIN management systems utilizes cryptogram and the new PIN along with user account information known to the system to build PIN change smart card command, generally in the form of a smart card instruction, command, encrypted data and integrity cryptogram. The PIN change command is converted into a form suitable for transmission.

Further, utilizing the cryptogram, smart card details and cryptographic keys the PIN management system can revival the new PIN and build a PIN change command code. On return of the PIN change command code to the smart card reader, the smart card reader formats and transmits the code as a smart card command (APDU) to the smart card which decrypts and processes the instruction from the PIN management system as a PIN change.

For the transfer of the PIN change command code from the PIN management system to the remote smart cards reader, such as the user transposing the code from an Issuer hosted web page, as an audibly encoded data stream, such as DTMF codes interpreted by the smart cards reader's microphone, and the Issuer hosted web page displaying the codes as a sequence of flashing lights interpreted by the smart cards reader's optical interface. Where the smart card reader repackages and sends the supplied data into the appropriate smart card commands. The success of the smart card processing would be returned to the User for reassurance purposes.

In addition to PIN change the solution described can also unblock smart cards where the user has entered the PIN incorrectly too many times, resenting the PIN to the same value or a new value. Once the PIN change command has been processed by the smart card the user can continue use of their smart card with the PIN changed and/or unblocked.

BRIEF DESCRIPTION OF THE DRAWINGS

The present disclosure is described in conjunction with the appended figures:

FIGS. 3A-C are block diagrams of embodiments of the data presented to the smart card to initiate the creation of a cryptogram;

Figure 1:
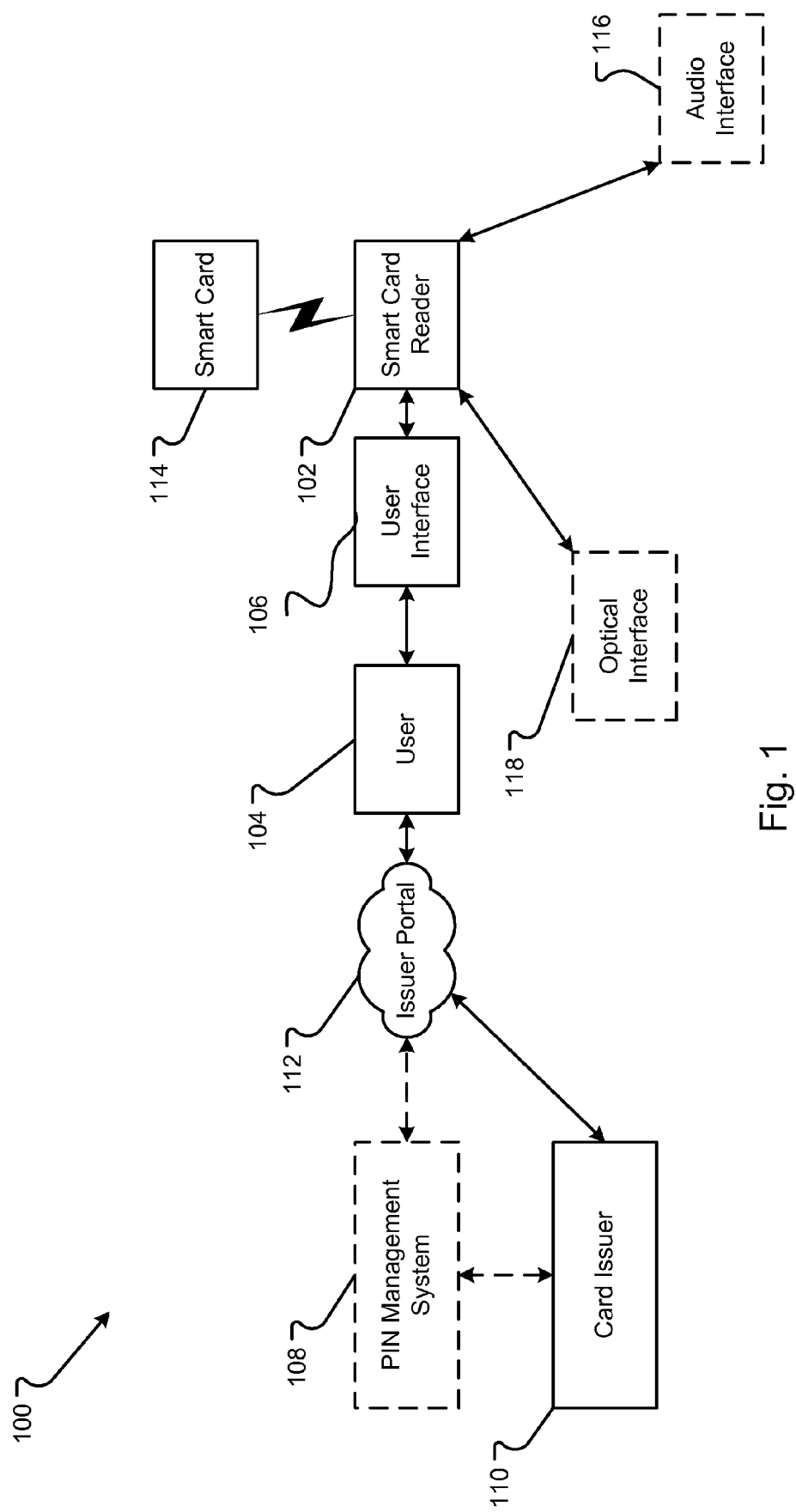
FIG. 1 is a block diagram of an embodiment of a system operable to manage the PIN of a user smart card.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the disclosure generally relate to systems and methods for managing a user's PIN associated with the user's smart card. In embodiments, a user supports the communication between an issuer's PIN management system and the smart card/smart card reader device. The communications used by can be can be the Internet or other public or private network, such as a feature provided on the Issuer's web site, telephone, text messaging, email or other open channel open between the User community and the Issuer.

The user communicates with a smart card reader at the user's facility. A user instructs the smart card reader to complete a PIN change for a smart card. The smart card reader reads information from the smart card. Further, the user can enter information into the smart card reader, for example, the new PIN. A message is created using the information from the smart card and the information from the user. In embodiments, the message is a seed to support the request to change the PIN. The message can include the new PIN requested, or the new PIN could be made available to the Issuer's PIN management system via other channels. The user supports the forwarding of the message to the PIN management system.

Generally, current systems do not have the ability to send the PIN change request though channels other than an open connection between the system of the Issuer and the smart card reader.

The PIN management system can be software at a card issuer or a separate system in communication with the card issuer. The PIN management system can receive the message from the user and send the PIN change request over a private network to the card issuer. The card issuer can receive the request message and authenticate the user with the information in the PIN change request message, such as a flag indicating the smart card has verified the current PIN. Other out of bound user authentication methods could be used such as username and password. If authenticated, the card issuer uses the provided cryptogram to build a PIN change command and sends a message back containing the PIN change command back to the user. The user can forward the response command to the smart card read, which changes the PIN information on the smart card. With this system, the user can manage the PIN and unblock their smart card without having to use an ATM or bank system to change the PIN.

The embodiments here are for use with existing smart card PIN change protocols such as those defined in EMVCo LLC specifications (EMV v4.2 Book 3 section 6.5.10). To communicate the PIN change command, the PIN management system may create an authorization message encoded to include the PIN change command.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer-readable medium" or "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels and various other mediums capable of storing, containing or carrying instruction(s) and/or data.

The usage of the user to assist in the transfer of data between the Issuer systems and the smart card device includes, but is not limited to, web site entry and display, audio transmission of codes, visually/optical transmission of codes.

Furthermore implementations may be designed to link the Issuer systems and the smart card device via the use of a personal computer connected to the internet or other such public network, removing the user responsibility of data transfer. In such as case the user 104 will be replaced by a personal computer operated by the user.

Embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

An embodiment of a system 100 for providing management of a user's PIN on a smart card 114 is shown in FIG. 1. A user 104 will communicate with a smart card reader 102. The smart card reader 102 is a system or device having hardware and/or software that can communicate with a smart card. A smart card 114 is a device confirming the ISO 7816 and/or ISO 14443 specifications or future specification of a similar nature. The smart card reader 102, in embodiments, can include or be in communication with a user interface 106 that allows the user to enter information into or receive information from the smart card reader 102. Optical interface 118 can be included to allow data to be interpreted by the smart card reader 102 from an optical source being a static image or a moving image sequence. Audio interface 116 may comprise of a speaker and/or microphone to enable data to transferred as audible signals such as, but not limited to DTMF tones.

In embodiments, the user 104 is operable to receive communications from and send communications to the smart card reader 102. Further, the user 104 is operable to receive communications from and send communications to a PIN management system 108. In embodiments, the user 104 communicates with the PIN management system 108 via an Issuer portal 112. The portal is a public network, for example, a web site on the Internet, telephone system available via a published number or email address provided to the user. The user 104 may be a supported by devices such as a laptop computer, a desktop computer, a mobile phone, a cellular device, a personal digital assistant with communication capability, etc. In alternative embodiments, one or more portions of the portal 112 between the user 104 and the PIN management system 108 include wired or wireless media, for example, a LAN, WAN, the Internet, a telephone system, etc.

The PIN management system 108, in embodiments, is part of the card issuer 110 or a physically separate entity that processes PIN management requests on behalf of a card issuer 110 desiring to allow PIN changes over a public network. The PIN management system 108 may communicate PIN change requests and receive PIN change commands for a card issuer. In other embodiments, the PIN management system 108 may be a function of the card issuer 110, for example, a bank, that processes credit or debit authorization requests without a separate outside entity. The PIN management system 108 may have a predefined relationship with the card issuer 110 that issued the smart card 114, such that the PIN management system 108 communicates requests and receives commands over a private network between the PIN management system 108 and the card issuer 110.

Figure 2:
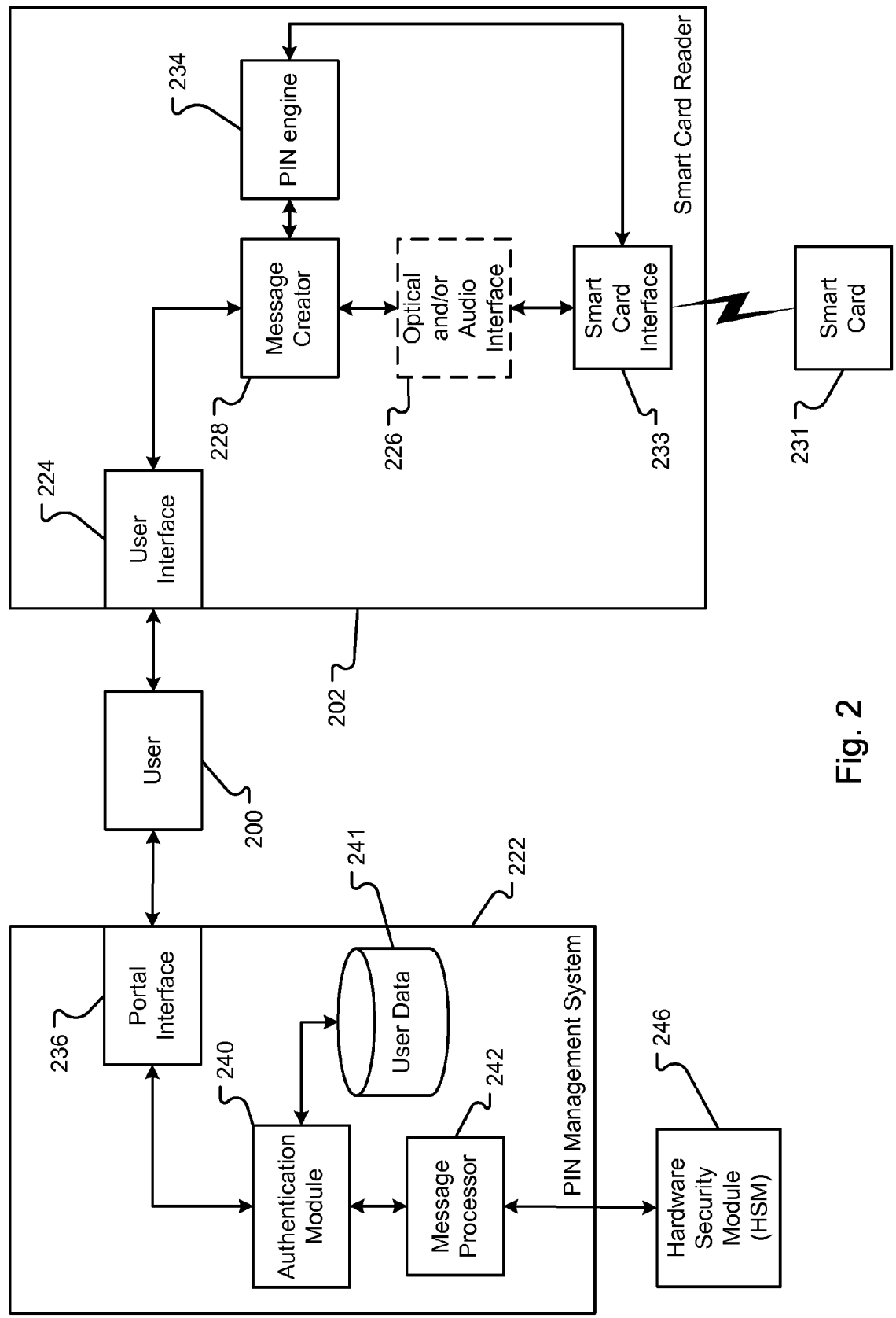
FIG. 2 is a set of hardware and/or software block diagrams of embodiments of a smart card reader and a PIN management system for use in a system for managing a user's PIN.

Turning now to FIG. 2, which illustrates a smart card reader and a PIN management system for use in a system for managing a user's PIN. The PIN engine 234 can verify the current PIN and instructs the smart card 231 to change to the new PIN when received. A PIN engine can receive the new PIN or request to change the PIN from the user interface 224 through the Message creator 228. To verify the old PIN or change to the new PIN, the PIN engine 234 communicates with the smart card interface 233. The PIN engine 234 reads the messages from the smart card 231 to extract information for generating the messages for the smart card 231. The message creator 228 is either hardware, software, or both hardware and software that builds condenses and formats messages to and from the PIN management system 222. The message creator 228 receives the PIN change information from the PIN engine 234. In embodiments, the message creator 228 prepares the cryptogram or other specially designed message for presentation to the user 200 on the user interface 224 or output via the audio interface 226. The user may copy the message from the user interface display into another application to send to the PIN management system 222. In other embodiments, the message creator 228 automatically sends the message through the user 200 to the PIN management system 222. The message can be a PIN change request message that includes the new PIN and is recognized as a PIN change request. Authentication of the user to the PIN management system is out of bounds but could include the current PIN validation performed by the smart card 231.

The portal interface 236 is operable to communicate with the user 200 or user 200's computer. The portal interface 236 may be any technology or system that can complete communications, such as a web site, telephone, IVR, email, text messaging, TCP/IP or other technology.

The authentication module 240, in embodiments, is a module that authenticates the smart card user using the information sent from the user 200 optionally with information sent from the smart card 23. The authentication information may include one or more of, but is not limited to, the user's name, the user's account number, the user's PIN, a password, a user-selected logon name, or another identifier for the user or the smart card. Thus, the authentication module 240 is operable to extract this information from the communication from the user 200 and authenticate the information to ensure the authenticity of the transaction. In alternative embodiments, the authentication module 240 is part of the HSM 246. If an authentication is unsuccessful, a signal may be sent to the user 200.

The Message processor 242 can receive a signal from the authentication module 240 that the information in the transaction is validated includes additional data from the User Data 241 that will be required by the Message processor 242 to complete its task.

One or more data structures used to store information in one or more components or transport information between the smart card 231, smart card reader 202, the user 200, and the PIN management system 222 are shown in FIGS. 3A-C.

The data structure field 300 FIG. 3A, in embodiments, includes one or more fields used in typical PIN change request messages; the fields may include, but are not limited to, Transaction Date/Time (310), Terminal Country Code (312), Transaction Currency Code (314), Transaction Amount (316). The precise details required to be provided by the smart card reader 102 to the smart card 114 are defined by the developer of the smart card.

The transaction details field 300 includes one or more fields containing information about the "pseudo transaction." The transaction details field 300 represents a pseudo transaction because the message, while formatted like a PIN change request message, is encoded to be a PIN change request message. As such, the transaction details field 300 may contain fields similar to a typical PIN change request message but may contain data representative of a PIN change request. The amount field 316 would typically contain the price being authorized for the transaction. For example, if the total for the transaction was $46.00, this amount would be entered in the amount field 316. Additional data elements may be required to be provided to the smart card as represented by the ellipses 318.

To provide the new PIN, the new PIN is entered into one of the fields of the transaction details field 300. In embodiments, the new PIN is entered into the amount field 316. As such, rather than containing an amount of a transaction, the amount field 316 includes the new PIN and can be recognized as having the new PIN. In one embodiment, all zeroes, other null values, or value determined form the smart card are entered into at least a portion or one or more data fields in the transaction details field 300. For example, all zeroes are entered into the Transaction Date field 310, Transaction Time field 312. In another embodiment, a predetermined code is entered into one or more fields. For example, the Terminal Country Code field 314 will contain a value previously known the smart card reader 102 by interrogation of the smart card 114.

FIG. 3B illustrates transaction details 307, which includes encrypted elements and can be decrypted by holder of the cryptographic key, generally restricted to the card issuer or the card issuer's service providers. In alternative embodiments, the transaction details 307 include one or more unencrypted items. In still other embodiments, the transaction details 307 include both encrypted and unencrypted copies of portions of the transaction details 300 along with other internal smart card data, such as Response Type ID 322, Transaction Counter 324, and Optional Data 330. Encryption also prevents a nefarious individual from having access to the PIN change request information, which could allow smart card transactions to altered or fraudulent transactions to be generated. In other embodiments, the cryptogram 328 is encrypted and can only be decrypted by holder of the cryptographic key, generally restricted to the card issuer or the card issuer's service providers.

In further embodiments, FIG. 3C includes a PIN management system user smart card reader response 308. In one embodiment the smart card reader response may include a number of blocks field, blocks 1 to n, and a checksum field. However, other fields may be included.

Figure 4:
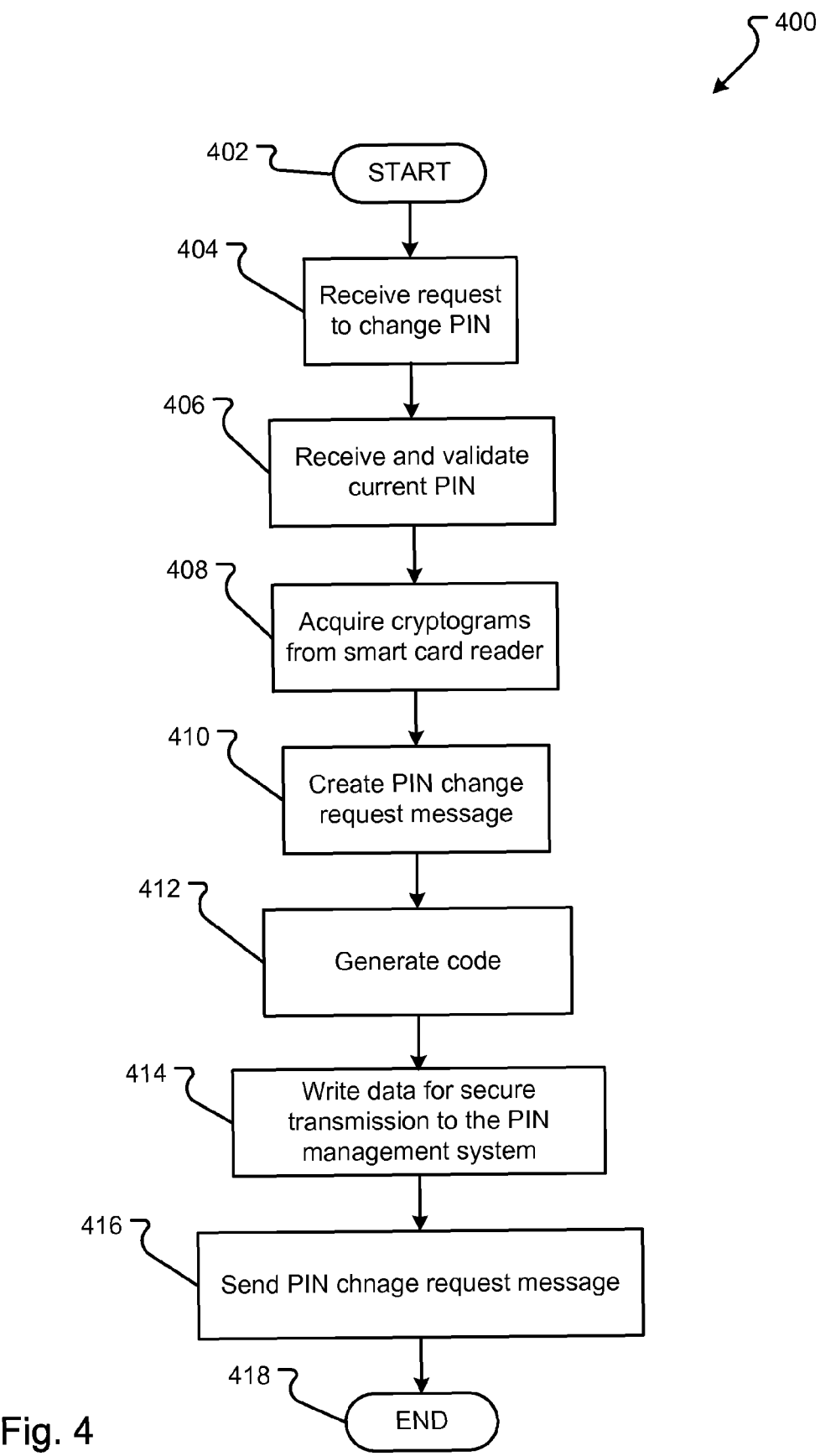
FIG. 4 is a flow diagram of an embodiment of a process for creating a PIN change request message having a PIN change request.

An embodiment of a method 400 executed at a smart card reader 202 for generating a cryptogram request that is included with the PIN change request is shown in FIG. 4. In embodiments, the method 400 generally begins with a START operation 402 and terminates with an END operation 418. The steps shown in the method 400 may be executed in a computer system or other electronic device as a set of computer-executable instructions. While a logical order is shown in FIG. 4, the steps shown or described can, in some circumstances, be executed in a different order than presented herein. Further, the steps shown in FIG. 4 may only be a subset or may be substituted for other steps not shown in FIG. 4. The method 400 of FIG. 4 will be explained with reference to the drawings in FIGS. 1-3C.

The smart card reader 202 receives a request to change the PIN for a smart card 114 in step 404. In embodiments, the user interface 224 of the smart card reader receives a selection of a PIN change, for example, a button or menu selection.

The smart card reader 202 may then prompt the user for a new PIN. Entry of the new PIN is not required if the user wishes to provide the new PIN via other channels or does not wish to change the PIN purely unblock the smart card that has locked due to too many failed PIN entries. The new PIN may be input into user interface 224. In another embodiment, the user provides the new PIN to the PIN management system via alternative methods including but not limited to clear text entry on to the card issuer's PIN entry web page, via DTMF tones into the PIN management system IVR interface, via SMS text message to the PIN management systems SMS interface, acceptance of a randomly generated PIN, or acceptance of a PIN from a selection of randomly generated PINs shared with the user on the Issuer's web page, where the user needs to make a selection either directly on the web site or entering the selection PIN identification number in to the user interface 224. The PIN or indication of chosen PIN, if locally entered, is sent to the message creator 228 and/or the PIN engine 234. The smart card reader 202 interacts with the smart card 231. In response to the request, the message creator 228 can direct the PIN engine 234 to extract information from the smart card 231. The PIN engine 234 sends the information request to the smart card interface 233 which interacts with the smart card 231.

The smart card reader 202 may then prompt the user for a current PIN. Entry of the current PIN is not required as it may no longer be known to the user. Step 406, receive and validate current PIN, is auctioned if the user wishes to enter the current PIN, via user interface 224 then the current PIN is sent to the message creator 228 and/or the PIN engine 234. The smart card reader 202 interacts with the smart card 231. In response to the request, the message creator 228 can direct the PIN engine 234 to extract information from the smart card 231. The PIN engine 234 sends the information request to the smart card interface 233 which interacts with the smart card 231.

Entering the current PIN onto a smart card capable of validating the user PIN offline enables the smart card cryptogram 328 to indicate to the PIN management system the successfully authentication of the user. In other embodiments the current PIN is included into the cryptogram 328 enabling the transport of the encrypted current PIN to be transferred to the PIN management system for authentication of the user. In furthermore embodiments the authentication of the user is conducted via alternative methods by the PIN management system including but not limited to user credential validated via online banking username and password onto a card issuer web site.

A cryptogram, PIN, or other information is acquired in step 408. In embodiments, the smart card interface 233 acquires the information from the smart card 231 and sends the information to the Message creator 228.

The PIN change request message is created in step 410. The PIN change request message one or more multiple purposes, including but not limited to, enter the smart card into a state ready to accept PIN change and/or other parameter management commands, to generate a seed needed by the PIN management system to preparing a PIN change command and/or other parameter management commands, to enable sensitive data to be securely transfer from the smart card to the PIN management system, and to allow the PIN management system to qualify if the current PIN has been verified by the smart card. The PIN change request message can include the cryptogram(s) and/or other data received from the smart card 231.

The Message creator 228 generates a code in step 412 and formats the data into a format suitable for transmission, via the User interface 224 and/or audio interface 226. Depending on the transmission method of the PIN change request message to the PIN management system various encoding methods can be used, such as but not limited to, DTMF tones in order for the message data to be transmitted and received by the PIN management system, or compacting in order to reduce the amount of data transferred and format the data into a limited range of characters such as but not, limited to 0 ... 9(decimal), 0 ... 9+A ... Z (numeric plus uppercase letters), 0 ... 9+A ... Z+a ... z (numeric, uppercase letters plus lowercase letters), all standard keyboard characters (for example ASCII characters codes 0x21 ... 0x7E inclusive).

The Message creator 228 may build the cryptogram generation command to the smart card 231 utilizing zeroes or other predetermined codes into one or more of the fields of the cryptogram request message, as explained in conjunction with FIG. 3A. Further, the Message creator 228 can write data for secure transmission to the PIN management system, such as the new PIN received from the user and/or the current PIN, into the cryptogram request message in step 414. For example, the Message creator 228 enters the new PIN in the amount field 316 of the cryptogram request message as explained in conjunction with FIG. 3A. The smart card reader 202 sends or forwards the cryptogram request message in step 416. The PIN change request message can be sent by the user interface 224 or the audio interface 226 to be sent to the PIN management system 222.

Figure 5:
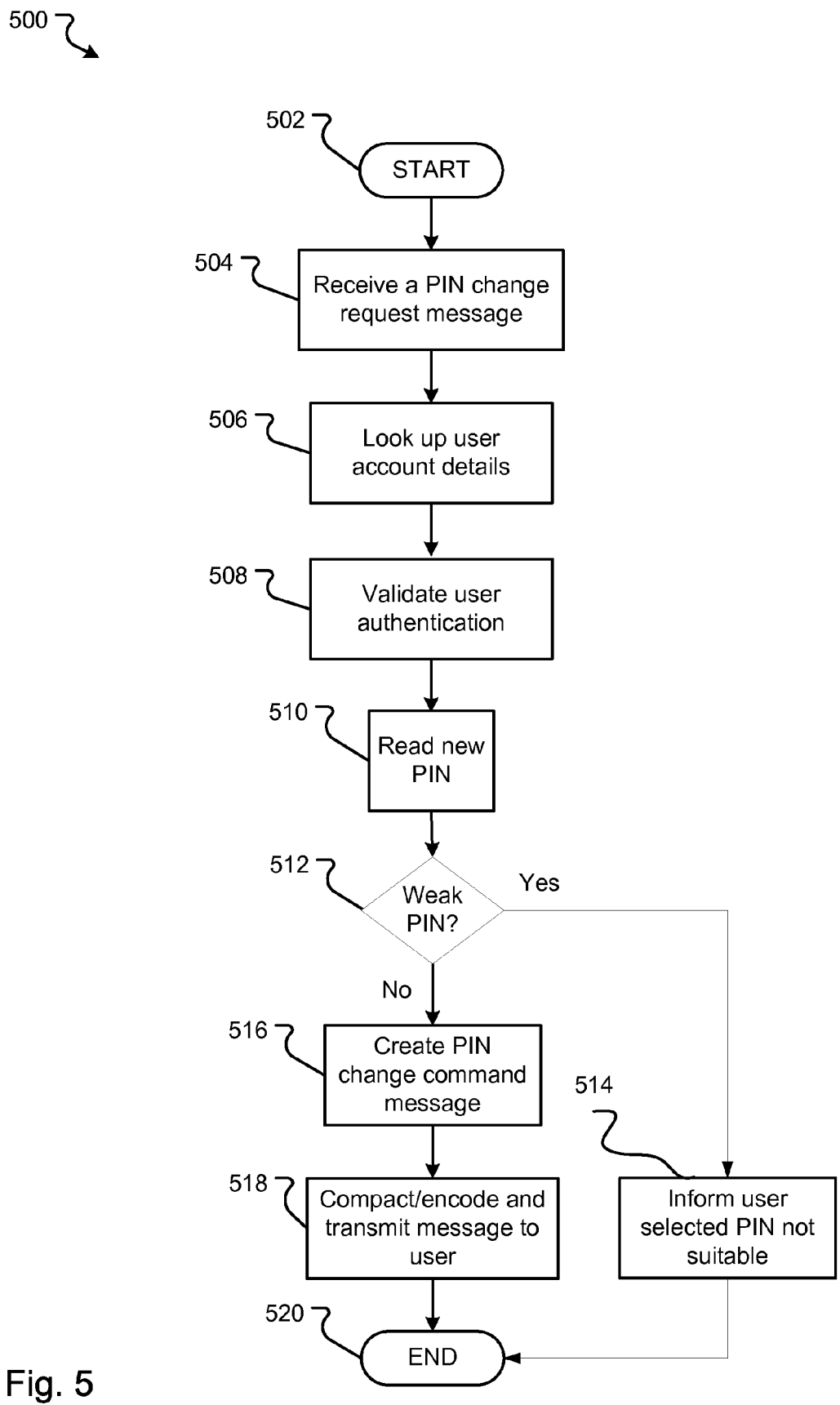
FIG. 5 is a flow diagram of an embodiment of a process for determining that the PIN change request message is a PIN change request.

An embodiment of a method 500 executed at a PIN management system 222 for processing a PIN change request and generating PIN change command for a smart card 231 is shown in FIG. 5. In embodiments, the method 500 generally begins with a START operation 502 and terminates with an END operation 520. The steps shown in the method 500 may be executed in a computer system as a set of computer-executable instructions. While a logical order is shown in FIG. 5, the steps shown or described can, in some circumstances, be executed in a different order than presented herein. Further, the steps shown in FIG. 5 may only be a subset or may be substituted for other steps not shown in FIG. 5. The method 500 of FIG. 5 is explained with reference to the drawings in FIGS. 1 and 2.

The PIN change management system 222 receives a PIN change request message in step 504. The PIN change request message can be as described in conjunction with FIGS. 3B and 3C. The portal interface 236 may receive web requests from the user 200 having a PIN change request message. In other embodiments the portal interface 236 may receive messages as DTMF signals. In further embodiments the portal interface 236 may receive TCP/IP message from a front-end computer.

The Authentication module 240 reads the PIN change request message in step 504. The Authentication module reformats where the PIN change request is based on a compacted to reformulate the fully formed cryptogram and any other associated data. In embodiments where the PIN is not provided via the PIN change request message, new PIN will have been previously agreed and will be retrieved by the Authentication module 240 from the User Data 241.

Utilizing the information attained previously, such as the user's account number and data in the PIN change request message the Authentication engine 240 determines the validity of the cryptogram any other associated data. At step 506, the user account details are looked up. At step 508 the Authentication module 240 may determine if the user has been authenticated by the smart card 231 or conduct user authentication with the current PIN cryptographically embedded within the PIN change request message. In other embodiments and if the users has no knowledge of their current PIN, the Authentication module will ensure satisfactory methods of user authentication are or have been conducted.

The Message processor 242 can read the new PIN in the Amount field 316 in step 510. In other embodiments, when the new PIN is not provided via the PIN change request message, the new PIN will be provided to the Message processor 242 from the Authentication module 240. The Message processor 242 may validate that the new PIN against the card issuer's weak PIN rules and reject PIN change requests determined to be weak at step 512. If the PIN is determined to be weak (or otherwise unsuitable), at step 514 the user is informed that the selected PIN is unsuitable. Otherwise the process continues to step 516.

The Message processor 242 will build a PIN change message. The new PIN along with additional user smart card data, such as Account Number, Transaction Counter and Cryptographic Key(s) will be processed typically with the support of a Hardware Security Module (HSM) 246 to create a smart card update command (APDU).

When the PIN change command has been generated (at step 516) the Message processor 242 will format and/or compact the message, according to the communication channel being utilized, ready for transmission to the user 200. The PIN management system 222 sends or forwards the PIN change message to the user 200 for onward transport to the smart card reader 202 in step 518. In embodiment the utilize optical or audible DTMF tones for data transmission the Portal interface 236 will prompt the user 200 for correct placement of the smart card reader 202, upon instruction from the user 200 the transmission of the PIN change message will be started.

Figure 6:
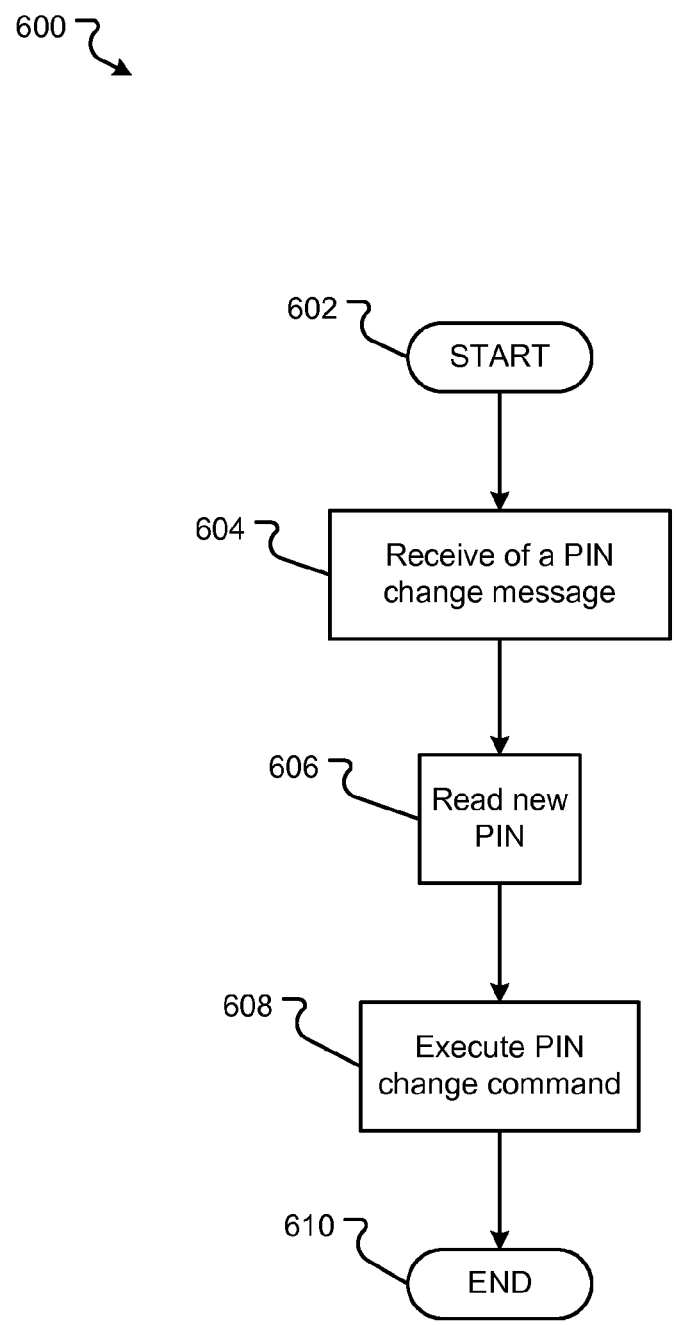
FIG. 6 is a flow diagram of an embodiment of a process for determining that an authorization message is a PIN change command.

An embodiment of a method 600 executed at a smart card reader 202 for identifying a PIN change command and changing a PIN for a smart card 231 is shown in FIG. 6. In embodiments, the method 600 generally begins with a START operation 602 and terminates with an END operation 610. The steps shown in the method 600 may be executed in a computer system as a set of computer-executable instructions. While a logical order is shown in FIG. 6, the steps shown or described can, in some circumstances, be executed in a different order than presented herein. Further, the steps shown in FIG. 6 may only be a subset or may be substituted for other steps not shown in FIG. 6. The method 600 of FIG. 6 will be explained with reference to the drawing in FIG. 1.

The smart card reader 202 will remain in a state awaiting a response from the PIN management system, the user 200 to manually cancel the procedure or a timeout event. At step 604 receipt of a PIN change message occurs. The PIN change message can be as described in conjunction with FIGS. 3A-3C. The user interface 224 will receive a message from the PIN management system 222, via the user 200, conforming to a PIN change message. Other embodiments utilize the optical and/or audio interface 226 to receive the message from the PIN management system 222.

The message creator 228 will package the PIN change message into a smart card command for processing by the smart card interface 233 and smart card 231. In other embodiments the PIN change message from the PIN management system will include parameter management commands for the user's smart card, in these cases the Message creator 228 will packing the data into one or more smart card commands in addition to or instead of a PIN change command. At step 606, the new PIN is read, and then at step 608 the PIN change command is executed.

Figure 7:
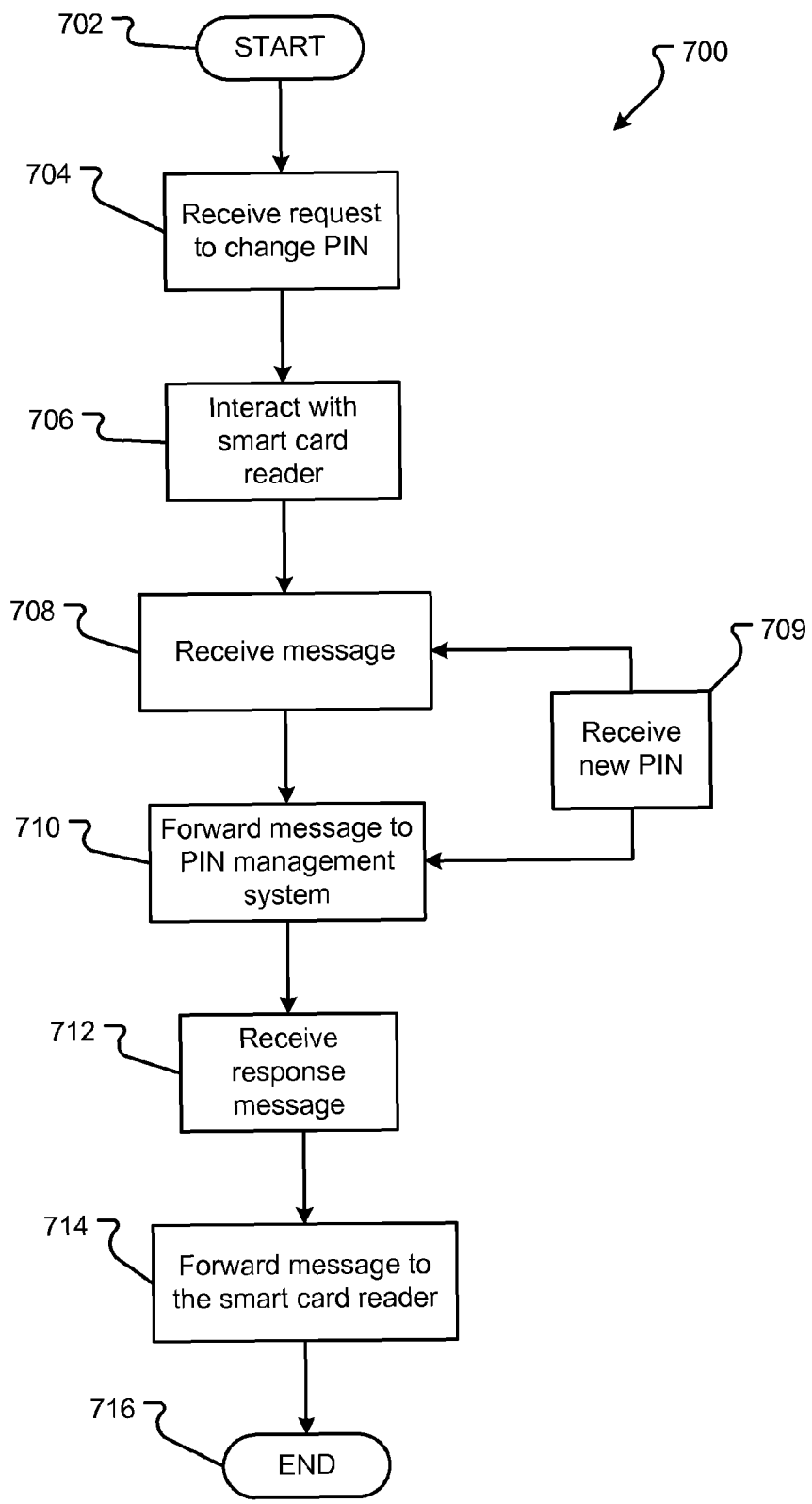
FIG. 7 is a flow diagram of an embodiment of a process for managing a user's PIN with a user computer.

An embodiment of a method 700 executed at a smart card reader 202 (FIG. 2B) for processing a PIN change request is shown in FIG. 7. In embodiments, the method 700 generally begins with a START operation 702 and terminates with an END operation 716. The steps shown in the method 700 may be executed in a computer system as a set of computer-executable instructions. While a logical order is shown in FIG. 7, the steps shown or described can, in some circumstances, be executed in a different order than presented herein. Further, the steps shown in FIG. 7 may only be a subset or may be substituted for other steps not shown in FIG. 7. The method 700 of FIG. 7 will be explained with reference to the drawings in FIG. 1.

The user 200 receives a request to change the PIN for a smart card 114 in step 704. In embodiments, the user interface 224 receives a selection of a change PIN user interface device, for example, a button or other icon in a window. The user 200 interacts with the smart card reader 202 in step 706. The user 200 may also initiate a PIN change program to change the PIN of the smart card 231.

The user may be asked for a new PIN and a new PIN may be received in step 709. The new PIN may be input into the PIN change program and communicated to smart card reader 202. The user computer can receive a PIN change message created by the smart card reader 202 in step 708. The PIN change message can be a cryptogram or other indecipherable message presented to the user 200 from the smart card reader 202. The user may copy the message (the cryptogram) from the user interface window of a PIN change program to a web page or other user interface window. Then, the user 200 can forward the PIN change message 300 to the PIN management system 222 in step 710.

The user 200 can receive a response message 320 from the PIN management system 222 in step 712. The response message 307 may be another indecipherable message that the user copies from the user interface window of a web page or other program to the user interface window of the PIN change program. The user 200 may then forward the response message 307 to the smart card reader 202 in step 714.

In other embodiments, the user 200 generates the PIN change message after receiving the new PIN in 709. In this embodiment, the smart card reader 202 may send information to the user 200 to generate the PIN change message. The user 200 may also authenticate with the authentication module 208 before interacting with the smart card reader 202 in step 706. To authenticate, the user 200 may request information that can be checked against stored information at the PIN management system database 241.

Figure 8:
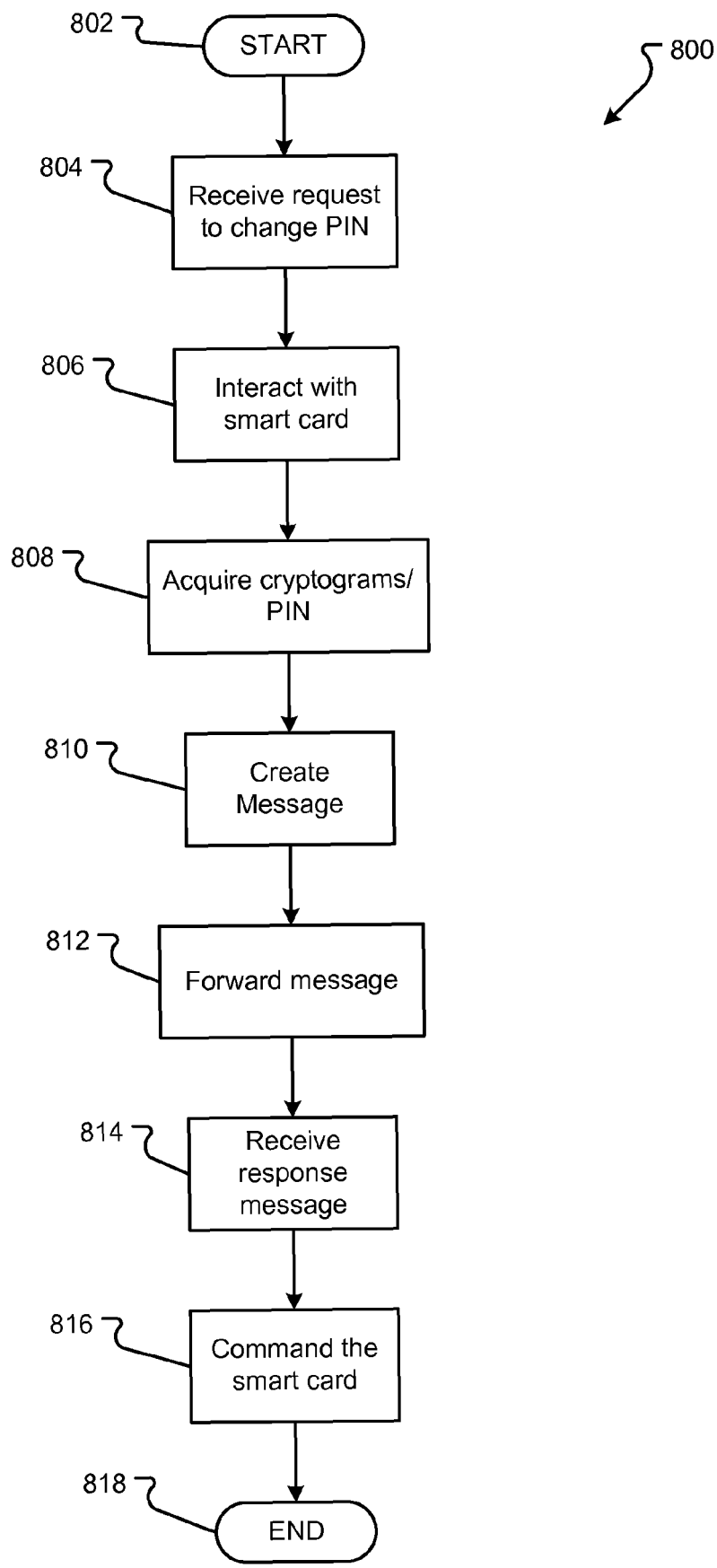
FIG. 8 is a flow diagram of an embodiment of a process for managing a user's PIN with a smart card reader.

An embodiment of a method 800 executed at a smart card reader 202 for changing a PIN for a smart card 231 is shown in FIG. 8. In embodiments, the method 800 generally begins with a START operation 802 and terminates with an END operation 818. The steps shown in the method 800 may be executed in a computer system as a set of computer-executable instructions. While a logical order is shown in FIG. 8, the steps shown or described can, in some circumstances, be executed in a different order than presented herein. Further, the steps shown in FIG. 8 may only be a subset or may be substituted for other steps not shown in FIG. 8. The method 800 of FIG. 8 will be explained with reference to the drawings in FIG. 1.

The smart card reader 202 receives a request to change the PIN associated with the smart card 231 in step 804. In an embodiment, the user 200 sends a request to the user interface 224 that the user desires to change the PIN. In another embodiment, the user inputs the request to change the PIN into a user interface. The request is sent to the message creator 228 and/or the PIN engine 234. The smart card reader 202 interacts with the smart card 231 in step 806. In response to the request, the message creator 228 can direct the PIN engine 234 to extract information from the smart card 231. The PIN engine 234 sends the information request to the smart card interface 233 which interacts with the smart card 231.

A cryptogram, PIN, or other information is acquired in step 808. In embodiments, the smart card interface 233 acquires the information from the smart card 231 and sends the information to the PIN engine 234. The PIN engine 234 can store the information. The PIN engine 234 may create the cryptogram with the information from the smart card 231. A message is created in step 810. The message may be the cryptogram or include the cryptogram. In embodiments, the message is the same or similar to data structure 300. A user may provide the new PIN as an input to the user interface, which is received through the user interface 224. The message may be created by the message creator 228 with information provided by the PIN engine 234. The smart card reader 202 forwards the message in step 812.

A response message may be received by the smart card reader 202 in step 814. The response message may be the same or similar to message 307. The message creator 228 can then receive the message and extract the PIN change command for the PIN engine 234. The PIN engine 234 commands the smart card 231 to change the PIN in step 816. The PIN change command is sent to the smart card 231 through the smart card interface 233. A PIN change is made at the smart card 231 in accordance with the PIN change command. In embodiments, the smart card 231 stores the new PIN.

Figure 9:
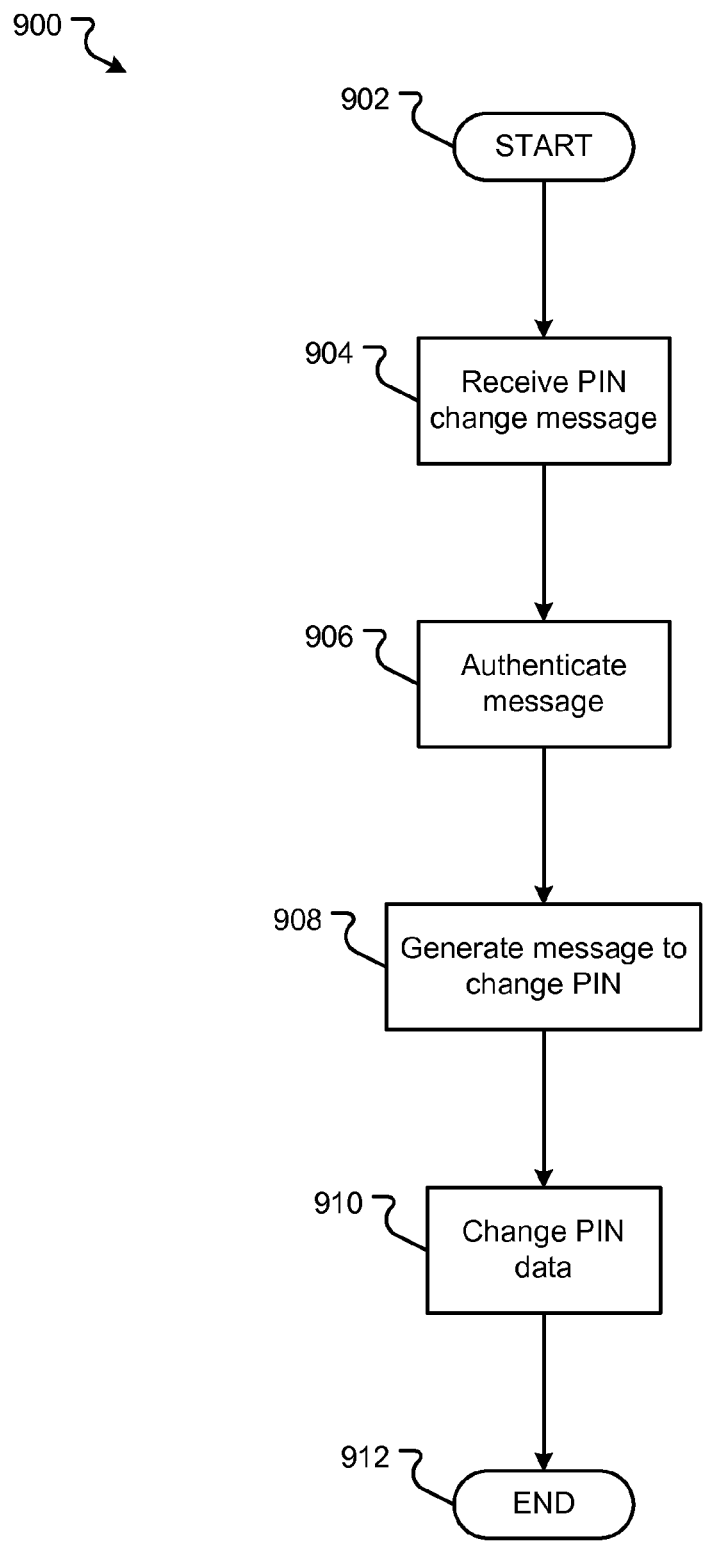
FIG. 9 is a flow diagram of an embodiment of a process for managing a user's PIN with a card issuer.

An embodiment of a method 900 executed at a PIN management system 222 and/or a card issuer 246 is shown in FIG. 9. In embodiments, the method 900 generally begins with a START operation 902 and terminates with an END operation 912. The steps shown in the method 900 may be executed in a computer system as a set of computer-executable instructions. While a logical order is shown in FIG. 9, the steps shown or described can, in some circumstances, be executed in a different order than presented herein. Further, the steps shown in FIG. 9 may only be a subset or may be substituted for other steps not shown in FIG. 9. The method 900 of FIG. 9 will be explained with reference to the drawings in FIG. 1.

The PIN change management system 222 receives a PIN change message in step 904. The portal interface 236 may receive a TCP/IP message from the user computer 200 having a PIN change cryptogram included in the message. In embodiments, the message is the same or similar to message 300.

To verify the user and/or the message, the authentication module 240 can authenticate the message or user in step 906. Authentication may include verifying a checksum or code embedded in the message or verifying information provided in the message with information stored in the user database 241. If the message is not authenticated, an error message may be sent to the user 200. The user 200 can attempt to resend the message. If the authentication fails for a predetermined number of messages, for example, three messages, the PIN management system 222 may prevent the PIN change by refusing further PIN change requests. If the message and/or user is authenticated, the message processor 242 of the PIN change management system 222 can generate a message to be sent to the card issuer system 246.

In other embodiments, the PIN management system 222 coverts the received message and send the message to the card issuer 246. For example, the received message may be a web-based message, and the message is converted to a format or protocol for sending to the card issuer, such as over an ACH network.

The message creator 228 generates the change PIN message in step 908. The PIN change message may be the same or similar to the message 308 described in conjunction with FIG. 3C. Information for the message may include a second cryptogram that represents a PIN change command, the new PIN, and other information. A PIN engine 234 can create the information. The PIN engine 234 can also change the PIN in step 910. The message can be sent though the ACH/Proprietary network interface and through the PIN management system 222 or through a network portal 236 to the user 200. Thus, the PIN change command is sent to the user 200 without sending the message through the PIN management system 222.

Figure 10:
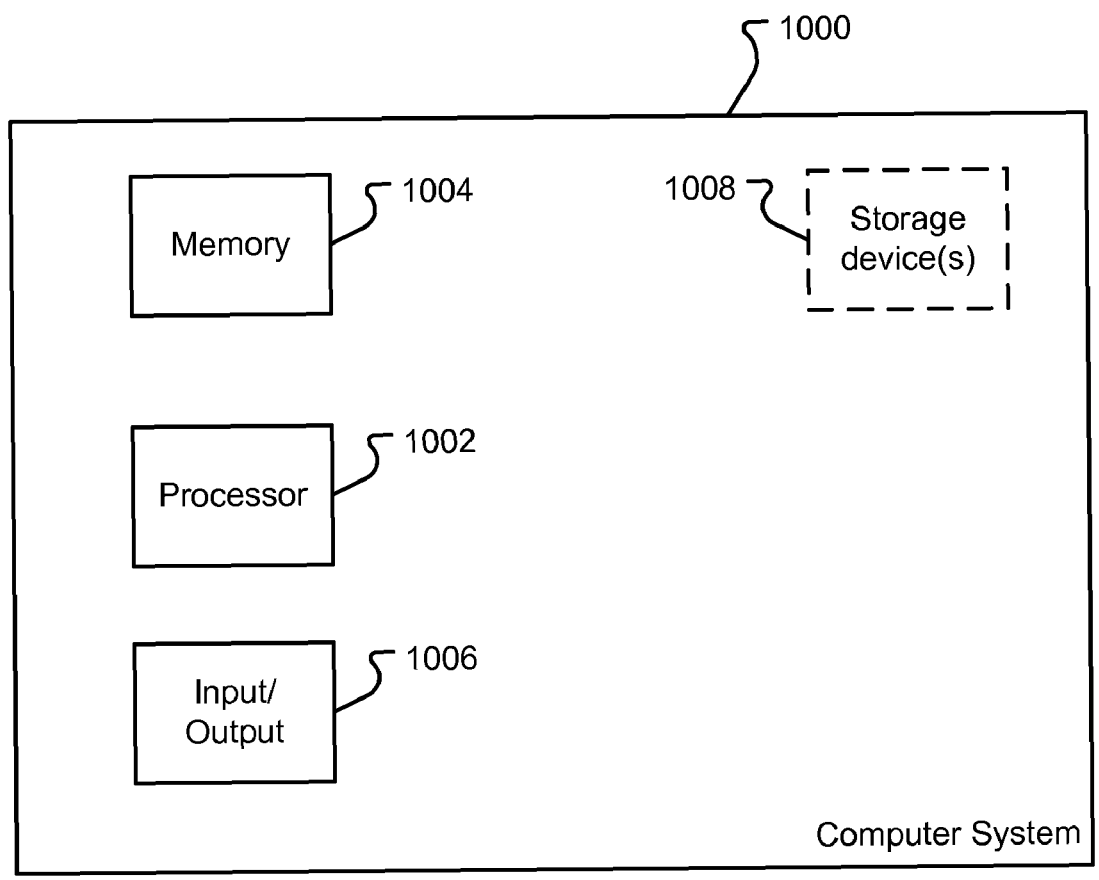
FIG. 10 is a block diagram of an embodiment of a computer system for use in the system for authorizing contactless payments.

Embodiments of the different systems represented in this disclosure, which may include the PIN management system 222, the user's 200 computer, and/or the smart card reader 202, may be a computer system, such as computer system 1000 shown in FIG. 10. While a basic computer system is shown, one skilled in the art will recognize the configuration changes and/or modifications that may be required to make operable the systems (e.g. smart card reader 202, PIN management system 222, etc.) described herein. The computer system 1000 comprises a processor 1002, which completes the operations described in conjunction with FIGS. 4 through 9 or makes the systems operable described in conjunction with FIG. 1. Further, the computer system 1000 can execute functions in response to receiving the data structures described in FIGS. 3A-3C. The processor 1002 may be any type of processor operable to complete the operations or implement the systems described herein. For example, the processor 1002 may be an Intel Pentium processor, an ASIC, an FPGA, or other device.

The computer system 1000 also comprises memory 1004 to hold data or code being executed by processor 1002. The memory 1004 may permanently or temporarily store the instructions described in conjunction with FIGS. 4 through 9 or the data elements described in conjunction with FIGS. 3A-3C. Memory may be classified as a computer-readable medium, for example, RAM, ROM, magnetic media, optical media, etc.

The computer system 1000 also can comprise software elements, including an operating system and/or other code, such as one or more application programs for authorizing contactless payments at any of the PIN management system 222 and/or the smart card reader 202. The application programs may comprise computer programs described herein, and/or may be designed to implement methods described herein and/or configure systems described herein. Merely by way of example, one or more procedures described with respect to the method(s) discussed in conjunction with FIGS. 4-7 might be implemented as code and/or instructions executable by the computer system 1000 (and/or the processor 1002 within the computer system 1000).

A set of these instructions and/or code might be stored on a computer-readable storage medium, such as the storage device(s) 1008 or memory 1004. In some cases, the storage medium might be incorporated within a computer system. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Further embodiments of the computer system 1000 comprise input/output (I/O) modules of systems 1006. I/O systems 1006 may include displays such as LCDs, plasma screen, cathode ray tubes, etc. The displays can provide a visual representation of data to a user. I/O system 1006 may also include input devices such as mice, keyboards, touch screens, etc. Input devices allow the user to input information into the computer system. I/O systems 1006 may also comprise communication systems such as wired, wireless, or other communication systems. Further, communication systems may communicate with peripheral devices, such as printers, modems, or other devices.

In light of the above description, a number of advantages of the present invention are readily apparent. For example, the systems allow for a user to change the PIN associated with the smart card at a user's home or business, or in embodiments when the user has access to a telephone.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the invention have been described above in connection with specific apparatuses and methods, it is to be clearly understood that this description is made only by way of example and not as limitation on the scope of the invention.

What is claimed is:

1. A system that manages a user's personal identification number (PIN) for a smart card associated with the user, comprising:
   a smart card reader having: a smart card interface that can interface the smart card reader with the smart card; a message creator connected to the smart card interface and that is operable to form a PIN change request message from data received from the smart card for communication from the smart card reader and to form a smart card command from a PIN change command received by the smart card reader for communication to the smart card; a PIN engine in communication with the smart card interface and the message creator, the PIN engine is operable to verify the PIN of the smart card and instruct the smart card to change to a new PIN; and a user interface in communication with the message creator;
   a PIN management system having a portal interface, an authentication module in communication with the portal interface, and a message processor connected to the authentication module; and
   a public network interconnecting the smart card reader and the PIN management system.

2. The system of claim 1, wherein the public network comprises a web site on the internet, a telephone system available by a published number, or an e-mail address provided to the user.

3. The system of claim 1, wherein the data received by the message creator from the smart card comprises a cryptogram, and the PIN change request message formed by the message creator for communication from the smart card reader includes the new PIN requested by the user.

4. The system of claim 3, wherein the PIN change request message includes an indication that the smart card's current PIN has been verified.

5. The system of claim 3, wherein the cryptogram includes the new PIN requested by the user.

6. The system of claim 1, wherein the PIN change command received by the smart card reader includes the new PIN.

7. A method of managing a user's personal identification number (PIN) for a smart card associated with the user, comprising:
   receiving a request for a PIN change of the user's smart card by a smart card reader, the request including a new PIN for the user's smart card;

the smart card reader transmitting the request for a PIN change and the new PIN to the user's smart card which generates a cryptogram that includes the new PIN;

transmitting the cryptogram from the smart card to the smart card reader and using the smart card reader to generate a PIN change request message from the cryptogram;

transmitting the PIN change request message from the smart card reader to a PIN management system which generates a PIN change command for transmission to the smart card reader, wherein the PIN change request message and the PIN change command are transmitted via a public network interconnecting the smart card reader and the PIN management system;

receiving the PIN change command from the PIN management system into the smart card reader which interprets the PIN change command and generates a smart card command; and transmitting the smart card command to the smart card to change to the new PIN.

8. The method of claim 7, wherein the public network comprises a web site on the internet, a telephone system available by a published number, or an e-mail address provided to the user.

9. The method of claim 7, wherein receiving the PIN change command from the PIN management system into the smart card reader comprises manually entering the PIN change command into the smart card reader.

10. A system that manages a user's personal identification number (PIN) for a smart card associated with the user, comprising:

a smart card reader having:
   a smart card interface that can interface the smart card reader with the smart card;
   a message creator connected to the smart card interface and that is operable to form a message from data received from the smart card for communication from the smart card reader and to form a command from a message received by the smart card reader for communication to the smart card;
   a PIN engine in communication with the smart card interface and the message creator, the PIN engine is operable to verify the PIN of the smart card and instruct the smart card to change to a new PIN; and
   a user interface in communication with the message creator.

11. The system of claim 10, wherein the data received by the message creator from the smart card comprises a cryptogram, and the message formed by the message creator for communication from the smart card reader comprises a PIN change request that includes the new PIN requested by the user.

12. The system of claim 11, wherein the cryptogram includes the new PIN requested by the user.

13. The system of claim 10, wherein the message received by the smart card reader comprises a PIN change command received from a PIN management system.

14. The system of claim 13, wherein the PIN change command includes the new PIN.

* * * * *